(12) United States Patent
Eriksson

(10) Patent No.: US 6,567,385 B1
(45) Date of Patent: May 20, 2003

(54) SYSTEM AND METHOD FOR TRANSMITTING INFORMATION FROM TERMINALS TO A CENTRAL NODE USING TDMA

(75) Inventor: Örjan Eriksson, Askim (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/255,928

(22) Filed: Feb. 23, 1999

(30) Foreign Application Priority Data

Feb. 24, 1998 (SE) .............................................. 9800538

(51) Int. Cl.⁷ .............................................. H04B 7/212
(52) U.S. Cl. ........................ 370/322; 370/337; 370/347
(58) Field of Search ................................. 370/337, 330, 370/347, 321, 349, 361, 461, 442, 322, 314, 348, 230, 231, 235, 236, 444, 412, 415, 417, 429, 443, 324

(56) References Cited

U.S. PATENT DOCUMENTS

| | | | |
|---|---|---|---|
| 4,843,606 A | | 6/1989 | Bux et al. |
| 5,579,306 A | * | 11/1996 | Dent ............................ 370/311 |
| 5,923,648 A | * | 7/1999 | Dutta ........................... 370/280 |
| 5,959,980 A | * | 9/1999 | Scott ............................ 370/280 |
| 6,192,029 B1 | * | 2/2001 | Averbuch et al. ............ 370/229 |

\* cited by examiner

Primary Examiner—Chau Nguyen
Assistant Examiner—Keith M. George

(57) ABSTRACT

A system and a method relating to TDMA communication. A number of terminal stations communicate with user stations and a central node. Separate frequencies are used for communication to and from the central node. Information to the central node is transmitted as bursts in frames and the bursts from the different terminals may be of different lengths. Scheduling means are provided in the central node for controlling the transmission of data in bursts from the terminal stations towards the central node and for maintaining information about the actual transmission demand from each terminal station. The scheduling means control the use of the frame structure for each terminal in agreement with said information through changing the sending of bursts within the frame structure without requiring buffering means of the central node and of the terminal stations to exceed a given size corresponding to the size required for steady state transmission. A transitional frame $F_{TR}$ is introduced during which at least a transitional burst $B_{TR}$ is sent, during which frame the change in transmission of bursts is handled.

31 Claims, 9 Drawing Sheets

SYSTEM AND METHOD FOR TRANSMITTING INFORMATION FROM TERMINALS TO A CENTRAL NODE USING TDMA

TECHNICAL FIELD

The present invention relates to a communication system implementing time division multiple access in which a number of terminal stations communicate with a central node and wherein information is sent in the form of bursts from the terminal stations towards the central node. The invention also relates to a method of communicating information, from a number of terminal stations to a central node, using time division multiple access.

The invention still further relates to a method of rearranging the transmission positions for bursts of information sent from a number of terminal stations in a point-to-multipoint system implementing time division multiple access depending on the transmission demand of the terminal stations.

STATE OF THE ART

In point-to-multipoint radio communication networks information is communicated between a central node (a radio node) and a number of terminal stations, also called radio terminals. Each radio terminal in turn continuously communicates with a user station arranged next to the terminal and the radio node continuously communicates with a transmission network. For communication from the radio node to the radio terminals, i.e. for downlink communication, the transmission is continuous and all terminals have got access to all the information, i.e. information is broadcasted. However, for communication from the terminals to the radio node, i.e. uplink communication, time division multiple access is implemented which means that the radio terminals communicating with the radio node share a common communication resource within which each radio terminal is assigned a time period during a frame, (the communication channel is divided into a number of frames), during which it is allowed to send a burst of information.

Thus information is sent in both directions between the transmission network and the users. During steady state operation, i.e. during normal operation, the radio terminals transmit regularly with a constant time interval, a frame, in which each terminal is assigned a given capacity and a given starting position so that the total capacity can be used as efficiently as possible which means that the bursts from the respective terminals are packed as densely as possible within the frame. However, the amount of data may vary from terminal to terminal which means that the bursts which are sent do not have to have a constant length in relation to each other. During the time period it takes to send a frame, all the active radio terminals must be allowed to send information at their predetermined time positions. The radio node comprises scheduling means which is used to determine these time positions.

In a point-to-multipoint access network it often occurs that the transmission demand, e.g. the amount of information that needs to be sent from terminals varies, or terminals may be disconnected as well as new terminals may be connected etc. It is then important that such changes can be handled in such a manner that the transmissions channels still can be used in an efficient way. This is done through rearranging the frame or by defragmentation of the frame. In order to provide for defragmentation, the time positions for sending bursts from the respective terminals have to be changed for example in order to enable the sending of information from a new connected terminal, i.e. that a time interval has to be made available to such terminal. The displacement of the transmission positions for the terminals must be handled in such a way that the new terminal is allowed to transmit information or that a terminal needing to send more information is enabled to do so etc. In a system not permitting reconfiguration of the transmission positions of the bursts from the respective terminals, buffering means provided in the radio node as well as in the radio terminal would only have to store the information corresponding to the number of information bits arriving during a frame. This however means, for example, that if a terminal is disconnected, there is a risk that the capacity of the channel might not be fully used.

However, a number of systems are known which permit the displacement of the transmission positions. FIG. 1A schematically illustrates bursts from a terminal, here denoted terminal T, which are sent in a first, early, position within the frame and the sending positions for which are changed to a later position within the frame. It should be noted that information or data continuously arrives to the terminal from the user station as well as data continuously is sent out from the radio node to the transmission network. Furthermore each burst contains the same amount of information and the information is buffered in buffering means BT in terminal T as well as in the radio node. As can be seen from FIG. 1A in frames N−1 and N, bursts $B_{N-1}$, $B_N$ are sent at a first position within the respective frame whereas in frames N+1 and N+2 burst $B_{N+1}$, $B_{N+2}$ are sent at a new, later position within the frames. This means that between frame N and frame N+1 the buffering means of the radio terminal has to store more information and the radio node has to send out prestored information.

This means that the total filling degree in the buffering means (terminal and node) is constant within the system but that data has been redistributed from the node to the terminal buffering means. This is graphically illustrated in FIGS. 1B and 1C respectively. In FIG. 1B the amount of data in the buffering means of the radio terminal is illustrated as it changes with time, i.e. from the sending of frames N−1 to N+2. Data in the buffering means of the radio terminal $D_{BT}$ during steady state operation maximally reaches a given value and as a burst is sent during frame N−1, the data in the buffering means of the terminal station is sent out. Thereafter, during the rest of the frame, data is collected until the sending of a further burst in frame N. However, since a displacement from an early position within the frame to a later position within the frame takes place during the time that passes between the sending of frame N to frame N+1, the data in the buffering means of the radio terminal is substantially doubled until a burst is sent out at the later position as illustrated with a burst $B_{N+1}$ in frame N+1. Then, again, a steady state operation is reinstated which however requires a larger buffer in the radio terminal. In FIG. 1C the corresponding situation for the buffering means of the radio node is illustrated and the amount of data in the node buffer $D_{BN}$ is illustrated as a function of time. As can be seen from FIG. 1C, the opposite situation occurs in the node buffering means and it will be realized that the sum of the data in the buffers in the radio node and in the terminal respectively, illustrated through X and Y respectively in FIGS. 1B and 1C, before and after the displacement, is the same, which means that the delay in the point-to-multipoint communication system will be the same but data has been redistributed to the buffering means of the radio terminal from the radio node. Thus, the same amount of data is sent every time but the sending is set out once which means that a larger delay is produced and large buffering means are required.

In order to allow the defragmentation of a channel it must also be possible to displace bursts from a later position to an earlier position within a frame. This is described with reference to FIGS. 2A–2C corresponding to FIGS. 1A–1C but with the difference that the change produced in frame N+1 is that bursts are sent at an earlier position. As can be seen from FIG. 2B it is a prerequisite by that the terminal has prestored data if it is to be able to send two bursts of the same size within a short period of time It is supposed that the amount of data is equal in each burst. There must also be free capacity in the buffering means of the node in order to be able to handle a fast filling up of the buffering means since two bursts of substantially the same size are received within a short period of time. Thus, the amount of information that is to be accumulated in the buffering means is given by the rate at which data is transmitted, the frame frequency and the maximum displacement of a burst within the frame. In a system admitting free displacement of a burst, i.e, from an earlier to a later position within a frame and vice versa, the buffering capacity has to be increased in proportion thereto, i.e. in proportion to the maximum displacement. This means that if a displacement of bursts throughout the frame is to be permitted, from one end position to another, the capacity of the buffering means must be doubled having as a consequence that also the delay is doubled. This is extremely disadvantageous since the delay in a transmission network should be as small as possible and a delay may lead to the production of echoes etc. for example in speech connections.

U.S. Pat. No. 4,843,606 shows a local area communication system comprising token rings which are interconnected by a time division multiplex unit via synchronous bandwidth managers issuing priority tokens for synchronous frames at regular intervals. Each synchronous bandwidth manager can be seen as a terminal unit which, depending on the demand, is assigned different bandwidth on the time multiplexed network. The assigned starting time positions can be rearranged in order to use the network efficiently. The starting position for transmission from a particular terminal changes successively over a frame during which two time slots are occupied which means that the same information is sent in the old as well as in tone new time slot. The object is to ensure a secure rearrangement and the same information is sent in two time positions.

SUMMARY OF THE INVENTION

What is needed is therefore a communication system using time division multiple access (TDMA), particularly a point-to-multipoint transport or access network, which can handle changes when the amount of information to be sent from terminals changes, when terminals are connected, disconnected etc. so that the common transmission channel is used in an efficient manner. Particularly a system and a method are needed through which it is possible to handle such changes without affecting the transmitted information and without loosing information. Particularly a system and a method are needed through which the delay can be kept as low as possible, and even more particularly be minimized. Particularly a system and a method respectively is needed through which the capacity in frames on the uplink from a number of terminals having a varying need of bandwidth towards a central node can be used in an efficient manner. Further yet a system and a method are needed through which the buffering capacity of terminal stations as well as of a central node can be kept as low as possible and independent of occurring changes. Particularly a system and a method are needed able to handle the situation when the bursts from different terminals have different lengths.

Therefore a TDMA system is provided which comprises a number of terminal stations each of which communicates with a number of user stations and with a central node. Information to the central node from a number of terminal stations is transmitted in frames as bursts of variable lengths and separate frequencies are used for communication to and from the central node respectively. Each terminal station comprises terminal station buffering means and the central node comprises node buffering means for buffering of information to be transmitted. In the node scheduling means are provided for controlling the transmission of information in bursts from the terminal stations towards the central node. The central node comprises means for collecting information about actual transmission demands from each terminal station and about connection/disconnection of terminals. The scheduling means comprises control means for controlling the use of the frame structure for each terminal in agreement with the aforementioned information through changing the sending of bursts within the frame structure without requiring the buffering means in the central node and in the terminal stations to exceed a given size which is given by the size required for steady state transmission so that the transmission delay in the system is minimized.

The node comprises means for introducing a transitional frame during which the terminal station performs a change in its transmission of information. In a particular embodiment the change in transmission of information from a terminal station comprises a change to sending a burst starting at a new position which is later in the frame than an old position at which a burst from the same terminal was sent in the preceding frame(s). Alternatively the change in transmission of information may comprise sending of a burst from a particular terminal station at an earlier position within a frame in relation to the position at which the burst from the corresponding terminal stations was sent in the preceding frame(s). In order to provide the means for maintaining information about the actual transmission demands of the terminal stations, signaling is used between the terminal stations and the node.

Advantageously the scheduling means decides which changes are to be undertaken depending on the information about transmission demand etc. that the scheduling means receives. The scheduling means also transmits information thereon to the terminals and synchronizes the changes in the terminal stations and the node.

Advantageously the sizes of the terminal station buffering means and the node buffering means respectively are given by the length of the frames and by the information transmission rate independently of the changes relating to transmission positions of bursts within a frame and the length of the bursts.

If the transmission position of a burst is displaced from an earlier to a later position within a frame, two bursts are sent at different positions during the transitional frame of which bursts one is a transitional burst. According to one embodiment a burst is sent at the earlier, or the old, position and a transitional burst is sent at the new position, which transitional burst contains the data collected in the buffering means of the terminal station since the sending of the preceding burst, i.e. the burst sent at the earlier position. In an alternative embodiment a transitional burst is sent at the earlier, old, position and in addition thereto a burst is sent at the new position within the transitional frame. Advantageously the number of bits in a transitional burst is the product of the rate at which information/data is received in the terminal station, the length of the frame and the proportion of the length of the frame that the transmission position of the burst is to be displaced. Thus, the length (size) of the transitional burst can be precalclated. In the subsequent frame, i.e. the frame following on the transitional frame, only a burst is sent in the new transmission position.

In another case the transmission position of a burst is displaced from a later to an earlier position within the frames. Then, during the transitional frame, only a transitional burst is sent which comprises at least part of the information collected since the preceding sending of a burst in the preceding frame, i.e. the frame preceding the transitional frame. According to one embodiment a transitional burst is sent substantially in the new position, as assigned by the scheduling means, during the transitional frame. A burst contains the data collected in the terminal station buffering means since the preceding transmission of a burst in the frame preceding the transitional frame.

In an alternative embodiment a transitional burst is sent during the transitional frame substantially at the old position which burst contains part of the information/data collected in the terminal station buffering means. In a particular embodiment the transitional burst is smaller than the burst sent in the old position and it ends at the end position at which a new burst of substantially the same size as a burst sent at the old position, should hive ended.

According to the invention the size of the transient burst can be calculated in advance; this is thus known to node and terminal and no signaling or handshaking is needed; i.e. no communication is needed as to the number of bits etc; all what is needed is information about whether to displace in one or the other direction and the amount of displacement.

Advantageously the number of data/information bits in the transitional burst, when displaced from a later to an earlier position within the frames, comprises the product of the data rate at which data is received in the terminal, the length of the frame and 1- (the proportion of the length of a whole frame that the burst is to be displaced). If the transmission position of a burst is to be displaced from an earlier to a later position within the frame by a distance which is smaller than the length of the old (ordinary) burst, the length of an old (ordinary) burst is extended so as to contain the bits received during the sending of a burst having the length of an old burst.

Correspondingly, when a burst is to be sent at an earlier position within the frame and the displacement is smaller then the burst itself, a burst which is smaller than an old (ordinary) burst is sent out during the transitional frame.

A method of communicating information from a number of terminal stations continuously receiving information from user stations to a central node is also provided. The central node continuously delivers information to a transmission network. The information is communicated from the terminal stations to the central node on a transmission channel divided into a number of frames using time division multiple access and the terminal stations send information in bursts at given first positions within the frames. The method comprises the steps of collecting information in the central node about the transmission demands of the terminal stations and about connection/disconnection of terminal stations, determining in the node, with the use of said information, whether the transmission positions of bursts from a terminal station needs to be displaced to an earlier or to a later position within the frames to meet the transmission demands to optimize the usage of the channel capacity, and providing the terminal station with information about a new transmission position. Furthermore it comprises the steps of introducing a transitional frame during which the change in transmission position is handled, which comprises the sending of at least a transitional burst without requiring enchanced buffering capacity neither in the node nor in the terminal station. In the subsequent frame, i.e. the frame following on the transitional frame, a burst is sent at the new position within the frame. In one case the transmission position of a burst within the frame is changed to a later position and the method then comprises the step of sending two bursts during the transitional frame, of which one burst is sent at the old position and the other at the new position and wherein one of the burst comprises a transitional burst of a shorter duration. According to one embodiment the method comprises the sending of a first burst at the old position, collecting received information bits in buffering means in the terminal station and sending a transitional burst at the new position comprising the information bits collected in the buffering means of the terminal station since the sending of the preceding burst from the same terminal within the transitional frame.

According to a preferred implementation the size of the transitional burst is calculated in the node wherein the size is determined using among others information about the length and direction of displacement.

In an alternative embodiment the method comprises the steps of sending a transitional burst at the old position within the frame, which burst comprises part of the information bits collected in buffering means in the terminal station and sending a further burst at the new position within the transitional frame which burst comprises the information bits collected in the terminal station buffering means.

The method also relates to changing the transmission position of the burst from a terminal station to an earlier position within the frame which includes the step of, in the transitional frame, only sending a transitional burst. Advantageously the transitional burst sent at the new position ends at the end position of the new position.

In an alternative embodiment the method comprises the step of sending a transitional burst at the old position within the frame which burst comprises only part of the information collected in the terminal buffering means since the preceding transmission of a burst from the same terminal in the preceding frame.

The invention also provides a method of rearranging the transmission positions for bursts of information sent from a number of terminal stations in a point-to-multipoint system using time division multiple access depending on the transmission demand of the terminal stations. The method comprises the steps of, collecting information in a central node to which information is provided about the transmission demands of the terminal stations (including connection/disconnection of terminal stations), establishing with use of said information whether a burst of a particular station needs to be sent at an earlier or at a later position within the frames, and introducing a transitional frame during which information is sent in at least a transitional burst so that in a subsequent frame the terminal station can send its burst at the new position and without requiring any additional buffering capacity neither in the terminal station nor in the central node for performing the rearrangement of transmission position. Particularly the method comprises the step of changing the sending position from an earlier to a later position within a frame through sending one burst at the old position and sending another burst at the new position within the transitional frame. The method also includes the step of changing sending position for a burst from a later to an earlier position within the frames, in which case only a transitional burst is sent during the transitional frame. The invention particularly relates to the use of the system as referred to above for speech and/or data communication in transmission channels on for example fiber links, coaxial cables or copper cables. Particularly the system is used for microwave communication point-to-multipoint systems but also for any other point-to-multipoint communication system.

BRIEF DESCRIPTION OF THE DRAWINGS

The invention will in the following be further described in a non-limiting way with reference to the accompanying drawings in which.

DETAILED DESCRIPTION OF THE INVENTION

Figure 1A:
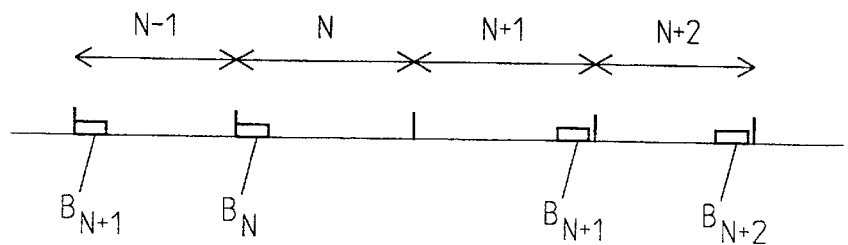
FIG. 1A illustrates conventional bursts sent from a terminal that are displaced from an earlier position within a transmission frame to a later position within a next transmission frame.
Figure 1B:
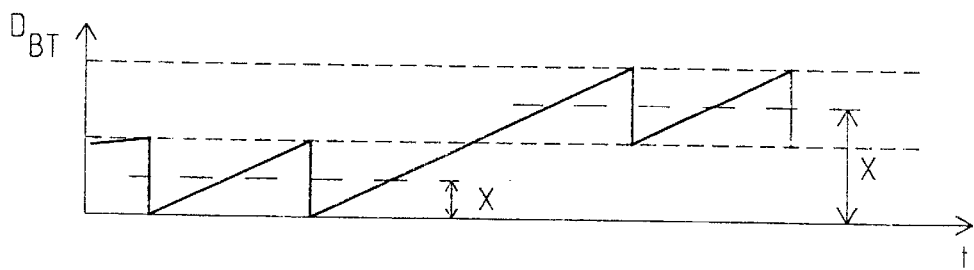
FIG. 1B illustrates the amount of data in the buffering means of a radio terminal as a function of time, and in connection with FIG. 1A.
Figure 1C:
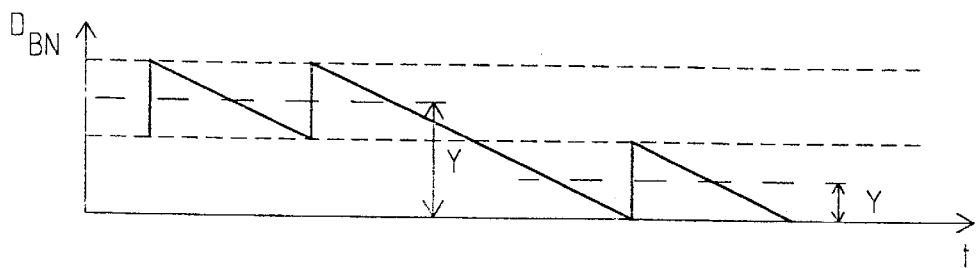
FIG. 1C illustrates the amount of data in the node buffering means of a radio node as a function of time, and in connection with FIG. 1A.
Figure 2A:
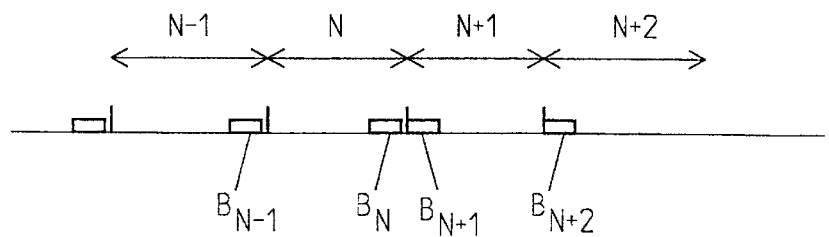
FIG. 2A illustrates conventional bursts sent from a terminal that are displaced from a later position within a transmission frame to an earlier position within a next transmission frame.
Figure 2B:
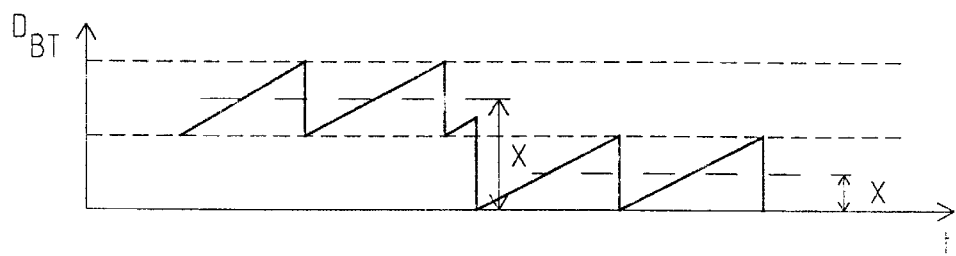
FIG. 2B illustrates the amount of data in the buffering means of a radio terminal as a function of time, and in connection with FIG. 2A.
Figure 2C:
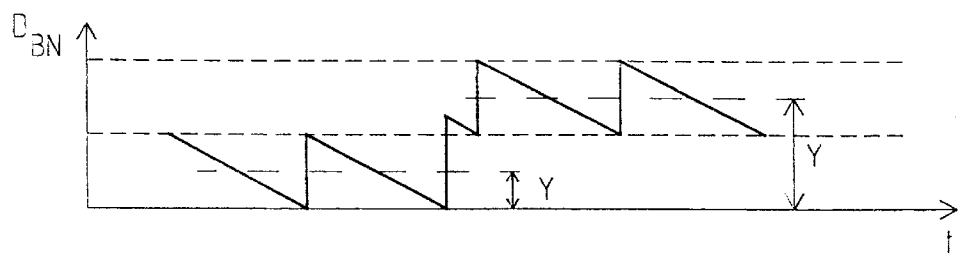
FIG. 2C illustrates the amount of data in the node buffering means of a radio node as a function of time, and in connection with FIG. 2A, FIG. 3 schematically illustrates a point-to-multipoint radio communication network in which information is transferred between a central node and a number of terminal stations.
Figure 3:
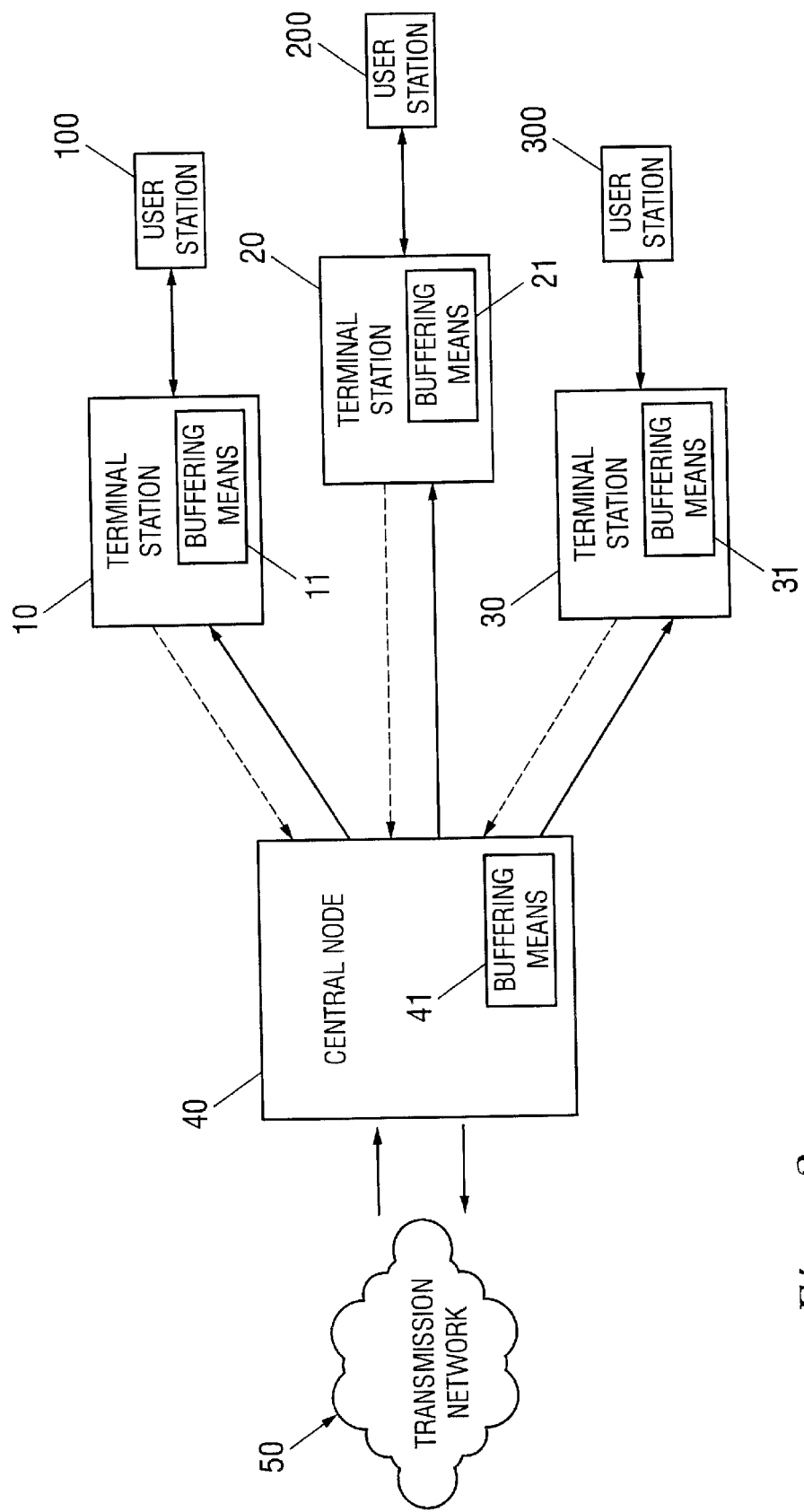

FIG. 3 schematically illustrates a point-to-multipoint radio communication network in which information is transferred between a central node 40 and terminal stations 10, 20, 30, particularly radio terminals. The communication from the central node 40 to the terminal stations 10, 20, 30 comprises a continuous transmission or broadcasting and all terminal stations 10, 20, 30 have access to all the information. In the figure continuous lines indicate a continuous flow of information whereas dashed lines indicate a discontinuous flow of information (uplink). Information is continuously transmitted from the central node 40 to the transmission network 50 and the terminal stations 10, 20, 30 continuously receive information from the user stations 100, 200 and 300 respectively. On the uplink from the terminal stations 10, 20, 30 to the central node 40 the terminal stations 10, 20, 30 share a common communication resource, i.e. time division multiple access (TDMA) is implemented. Thus information is transferred in both directions from the transmission network 50 and the user stations 100, 200, 300. The transmission on the uplink, i.e the channel from the terminal stations 10, 20, 30 to the central node 40 is divided into a number of frames in each of which each terminal station is allowed to send information in the form of bursts. Normally, i.e. if no changes occur, the terminal stations transmit during a constant time interval in a frame as referred to above. Each terminal station 10, 20, 30 comprises buffering means 11, 21, 31 in which information such as data or speech is collected between the sending of bursts (and also the smaller amounts of information or data that is received during the actual sending of a burst). In a similar manner the central node 40 comprises node buffering means 41 in which information/data is stored when a burst is received. However, as discussed above the amounts of information a terminal station needs to transmit, i.e. the transmission demand, may increase as well as decrease, a terminal station may be disconnected or a further terminal station may be connected. The common transmission channel must then be used as efficiently as possible and the transmission positions for the bursts from the concerned terminals need to be rearranged.

This rearrangement must then take place in such a way that the information to be transferred is not affected and no information should be lost. The figure is only shown in a schematical manner since the functioning of storing information in buffering means in terminal stations and a central node, respectively is supposed to be well known to the man skilled in the art. A time division multiple access system as a general rule comprises means for determining when and how the transmission channel is to be used. In the present invention such means are called a scheduling means. According to the invention the central node 40 via signaling is provided with information about all terminals stations, particularly their transmission demands, connection state etc. and it provinces for synchronisation of the terminal stations so that the channel can be used optimally. According to the invention the central node 40 also determines when and how the structure of the TDMA frames is changed which is done through using the information about the transmission demands from the terminal stations and the transmission state of the terminal stations, e.g. connected/disconnected etc. When the scheduling means has made a decision relating to a change in transmission position for bursts from a terminal station depending on its particular new needs or depending on new needs of one or more other terminal stations, information about the relevant change, or displacement of transmission position for the sending of bursts, is sent to the respective terminal station and the changes are carried out in a synchronized way both in the terminal station and the central node, i.e. the sending and the receiving side. The central node 40 will thus through signaling be aware of when and how a change is to be performed and in this manner it is prepared for a new TDMA structure. According to the invention a method and a system respectively are provided through which it is possible to displace the transmission position for a burst arbitrarily within a frame using small buffering means in the central node 40 and the terminal stations respectively. In that manner the smallest possible delay is produced in the system. According to the invention the central node 40 introduces a transitional frame during which the change or the displacement of transmission position is done by the terminal station and the central node 40 also informs the terminal station when such change is to be performed. During such transitional frame the bursts are sent in such a manner that the buffering means of the central node 40 and the terminal stations 10, 20, 30 respectively do not exceed their values as given by the normal state of operation or during steady state operation which means an operation state in which no changes occur; that the bursts are sent regularly and the transmission demands remain constant. The sizes of the buffering means 41; 11, 21, 31 of the central node and the terminal stations respectively are given by the length of the frames and by the rate at which information is transmitted but the sizes are independent of the changes or displacements as determined by the scheduling means and performed by the terminal stations. This means that advantageously the buffering size is about half that of the buffering size that is required when conventional techniques are used.

Figure 4A:
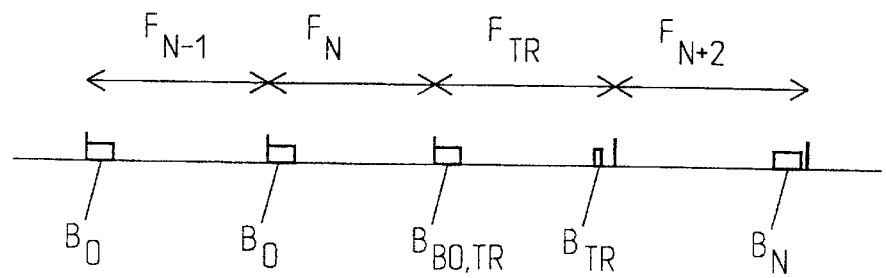
FIG. 4A shows a first embodiment in which the transmission position of a burst is displaced from an earlier to a later position within a frame.
Figure 4B:
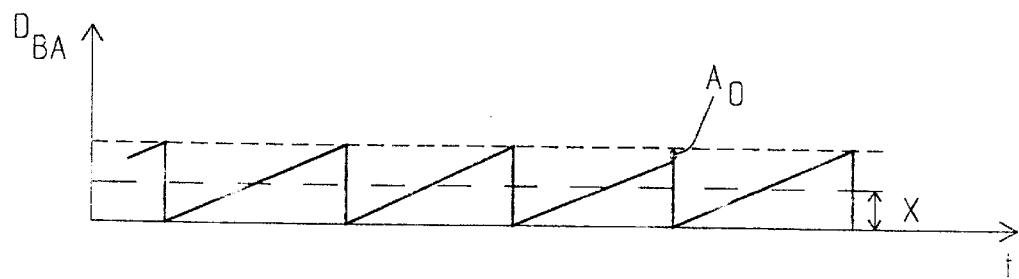
FIG. 4B is a graphical illustration of the amount of data stored in the terminal station buffering means for the displacement of FIG. 4A.

FIGS. 4A–4B illustrate one embodiment according to the invention in which an indication has been provided that the transmission demand (in general) has gone down, e.g. because one or more terminals have been disconnected. There may however also be other reasons for moving the transmission position of the bursts of a particular terminal to an earlier position within the frame, e.g. through the addition of terminal stations, disconnection of other terminal stations etc.; the reason is not important, what is relevant is however that the scheduling means of the central node 40 has established that the transmission position of a burst of a particular terminal station has to be changed from an earlier to a later frame position (to make use of free space that has been made available etc.)

Figure 4C:
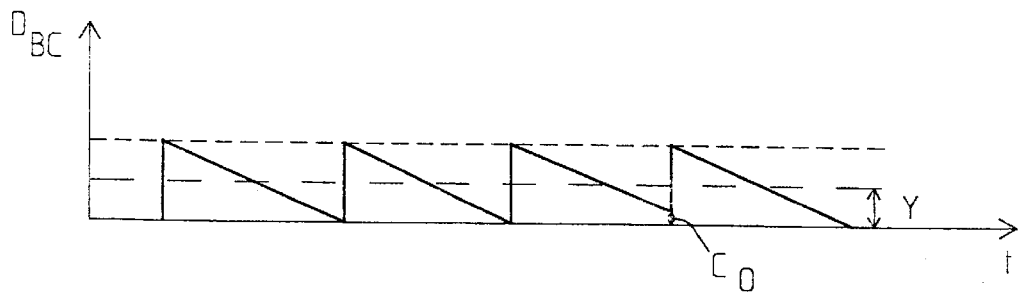
FIG. 4C is a graphical representation of the variation in the amount of data stored in the buffering means at the central node for a displacement as in FIG. 4A.

The significance of X and Y in the FIGS. 4B, 4C and further corresponding figures are the same as that as explained with reference to FIGS. 1B, 1C, 2B and 2C respectively.

FIG. 4A schematically illustrates a number of frames $F_{N-1}$, $F_N$, $F_{TR}$, $F_{N+2}$. During frames $F_{N=1}$, $F_N$ the terminal station transmits bursts regularly at an assigned old position $B_O$. However, the central node has, guided by the information about the transmission demand of the station, or some other station, decided that the concerned terminal station A has to transmit its bursts at an earlier position within the frames. Therefore a transitional frame $F_{TR}$ has been introduced during which the changing conditions are handled in a successive manner. In this particular embodiment a burst $B_{O,TR}$ is first sent at the old position, i.e. at the same position as the old bursts $B_O$, were sent. When this burst has been sent, however, the information stored in the buffering means of terminal station denoted A is sent out. This is illustrated through FIG. 4B in which the amount of information or data $D_{BA}$ is illustrated as a function of the time in the buffering means of terminal station A. The corresponding situation for the buffering means of the central node is illustrated in FIG. 4C wherein the amount of information or data $D_{BC}$ in the buffering means of the central node is illustrated as a function of the time. As can be seen from FIG. 4C, substantially simultaneously as the buffering means of the terminal is emptied, the buffering means of the central node is filled. During the transmissional frame $F_{TR}$ data again starts to store up in the buffering means of terminal station A until the new position within the frame is reached. This means the new position as decided by the scheduling means or control means of the scheduling means of the central node, to be the new sending position for the concerned terminal station A. Then, however, the buffering means of the terminal station has not been completely filled since it is still within the same frame and then a transitional burst $B_{TR}$ is sent out. It should be noted that there are still some space left in the buffering means of the terminal station indicated through $A_O$ in FIG. 4B. The buffering means of the central node at this time had not been completely emptied which means that there were still some data left in the node buffering means indicated through $C_O$ in FIG. 4C, since the buffering means of the terminal station had not been filled, the buffering means of the central node will only be filled up to the given, steady state operation level. Thus, to prevent that the buffering means of the terminal stations is filled more than normally, the transitional burst $B_{TR}$ is sent out during the transitional frame. The amount of information or data in the transitional burst. $B_{TR}$ among others depends on the length of the displacement that the central node has ordered. This means that the central node in advance is capable of calculating the size of the content in the transitional burst. It is supposed that the rate at which information or data is input to the terminal station is F bits per second. The length of a frame is supposed to be t seconds. The number of bits in a normal (ordinary) or old burst $B_O$ is then $B_B$ given by product of the rate F at which data is input to the terminal and the frame length t, i.e. Fxt bits. It is then supposed that the transmission position for the burst is displaced to a later position wherein the displacement is a fraction N of the frame length t, wherein 0<N<1. The number of information bits in the transitional burst will then be $B_{TR}=F \times t \times N$ bits. Supposing that the data transmission rate is 2048 kbps and the frame length is 125 μs, a burst (an old burst $B_O$) will contain 256 bits. If the burst then is displaced 25% of the length of the frame to a later position, this means that the transitional burst $B_{TR}$ will contain 25% of the number of bits contained in the normal burst, i.e. 64 bits. It is only the transitional burst $B_{TR}$ which has a content differing from the content of the other bursts $B_O$, $B_N$ (burst in new position). Therefore it is particularly easy for the central node to handle the transition from one transmission position to another, in this case a later transmission position. It should be noted that the given filling levels of the buffering means as indicated in FIGS. 4B, 4C will not be exceeded, neither in the terminal station, nor in the node, which means that the buffering means both in the node and the terminal station can be reduced in relation to in hitherto known systems. If it is supposed that an arbitrary displacement of a burst within the frame is permitted, the total size of the buffering means can be reduced by 50%. This also means that the delay because of buffering within the system is reduced by 50%, which is extremely advantageous In FIGS. 5A–5C an embodiment is illustrated in which the transmission position of a burst is displaced from a later to an earlier transmission position within a frame. The figures are similar to those of FIGS. 4A–4C and the same denotations are used. In this case only one burst is sent during the transitional frame $F_{TR}$, namely the transitional burst $B_{TR}$. This transitional burst contains fewer bits than a normal burst, i.e. the old burst $B_O$ as well as the new burst $B_N$. The transitional burst is allowed to contains fewer bits than normally, the terminal station buffering means being required to handle two bursts which are transmitted with a short period of time between them, and only those bits having been collected after the old burst $B_O$ was sent in the precious frame $F_N$ are contained in the transitional burst $B_{TR}$. This means that the requirements as to buffering size are reduced. The central node does also not have to double its storing capacity in the buffering means since the transitional burst only fills up the buffering means to the normal level, as can be seen from FIG. 5C. In an advantageous embodiment the transitional burst is sent at a position which ends at the position at which a normal burst would have ended if sent in its new position, i.e. the position at which the new burst $B_N$ sent in frame $F_{N+2}$ ends. In an alternative embodiment the transitional burst is sent earlier or at the beginning of the new position.

In this case the number of bits in the normal burst (old burst or new burst) again is given by $B_B=F \times t$ bits, with the same denotations as in the embodiment described with reference to FIG. 4A. It is then supposed that the burst is to be displaced a proportion N, wherein 0<N<1, of the frame length to an earlier position within the frame. The number of bits in the transitional burst $B_{BTR}$ will then be $F \times t \times (1-N)$ bits. As an example, if the data rate for example is 8448 kbps and the length of the frame is 125 μs, an ordinary burst will contain 1056 bits. If the burst is displaced to a position 25% of the frame length towards an earlier position, this means that the transitional burst will contain 75% (1–0,25) of the number of bits of a normal burst, i.e 792 bits.

Figure 6A:
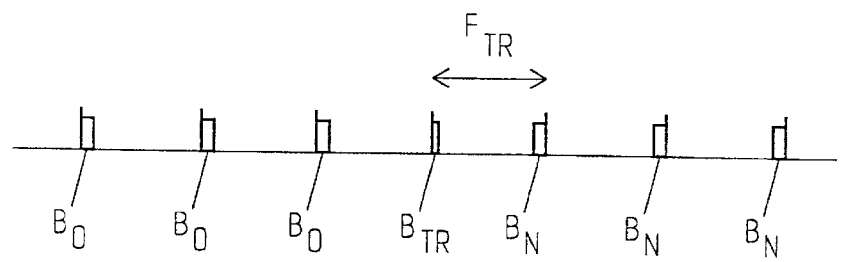
FIG. 6A shows an alternative embodiment for displacing the transmission position of a burst from an earlier to a later position within a frame.
Figure 6B:
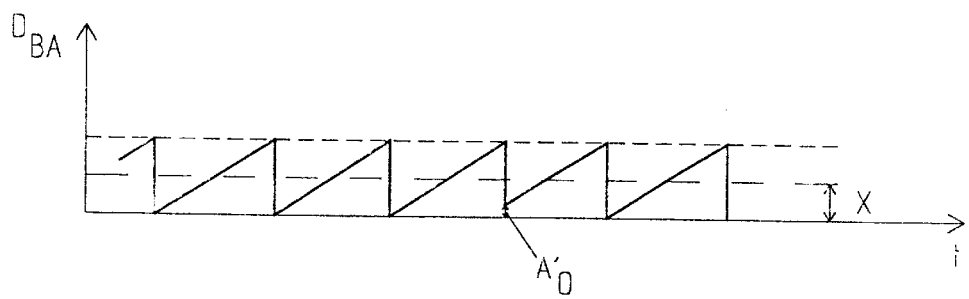
FIG. 6B illustrates the variation in amount of data in the buffering means of the terminal station when a displacement according to FIG. 6A is carried out.
Figure 6C:
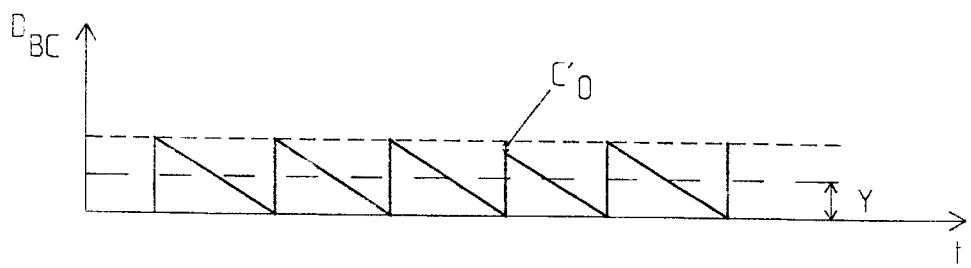
FIG. 6C illustrates the variation in amount of data stored in the buffering means of the central node when a displacement is carried out according to FIG. 6A.

FIGS. 6A–6C illustrate an alternative embodiment for displacing the transmission position of a burst from an earlier to a later position within a frame. The denotations are the same as in FIGS. 4A–4C. In this embodiment also a transitional frame $F_{TR}$ is introduced. During this transitional frame a transitional burst $B_{TR}$ is sent out at the old position but which however contains fewer bits than the ordinary bursts, or bursts sent out at the old (and new) positions. The buffering means of the terminal station will not be emptied completely as indicated through $A_O'$ in FIG. 6B. In addition thereto a new burst $B_N$ is also sent out during the transitional frame at the new position. This burst is of the same size as an ordinary burst. This means that, when the terminal station sends the first burst at the new position, the buffering means will be filled as can be seen from FIG. 6B and burst $B_N$ may contain the normal number of bits. In other aspects the solution is equivalent to that as described with reference to FIG. 4A. As can be seen from FIG. 6C, when the transitional burst is sent out, the buffering means of the central node is not filled completely but there is still some room left as indicated through $C_O'$.

Figure 5A:
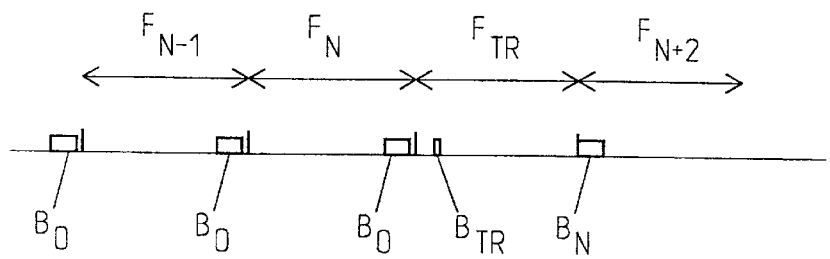
FIG. 5A illustrates a case in which the transmission position for bursts sent from a terminal station is changed from a later to an earlier position within a frame.
Figure 5B:
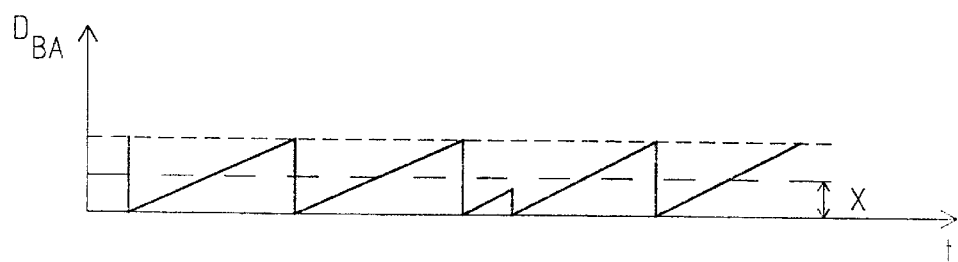
FIG. 5B is a figure similar to that of FIG. 4B but for the case as illustrated in FIG. 5A.
Figure 5C:
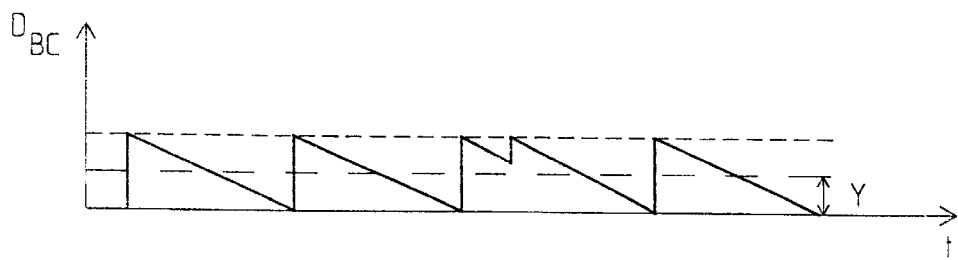
FIG. 5C is a graphical representation similar to that of FIG. 4C but for the case as illustrated in FIG. 5A.
Figure 7A:
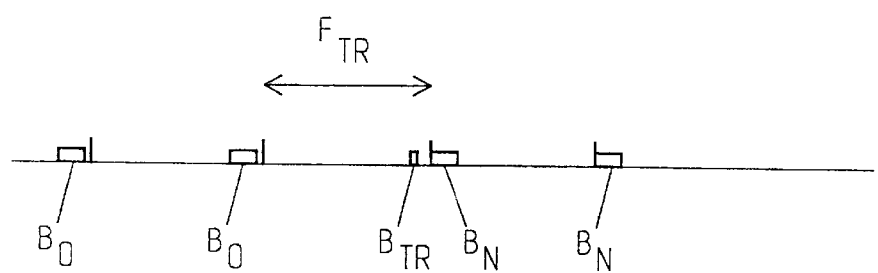
FIG. 7A illustrates an alternative embodiment for displacement of the transmission position of a burst from a terminal from a later to an earlier position within the frame.
Figure 7B:
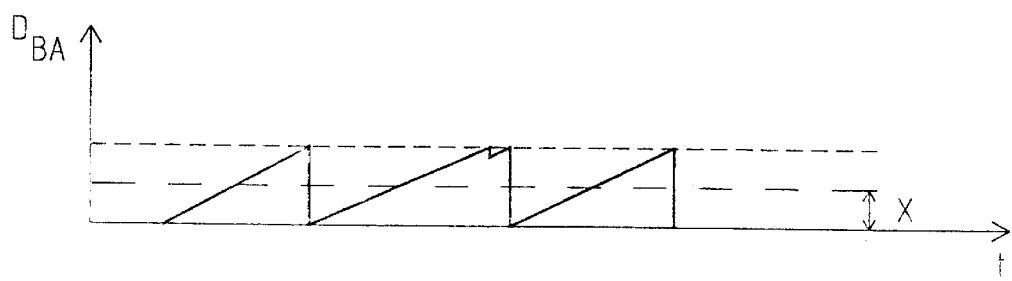
FIG. 7B is a graphical illustration similar to that of FIG. 6B but for the case as illustrated in FIG. 7A.
Figure 7C:
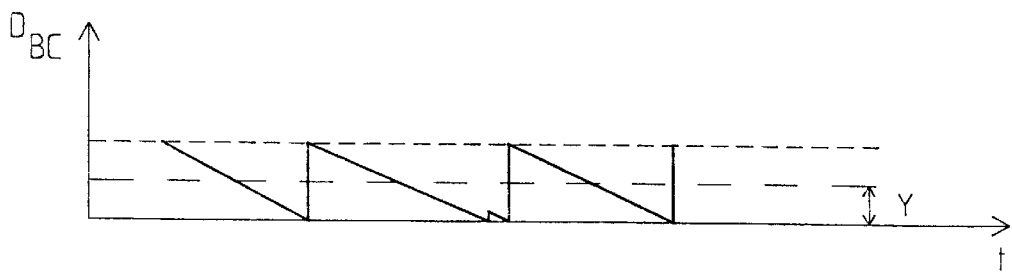
FIG. 7C is a graphical representation similar to that of FIG. 6C but for the case as illustrated in FIG. 7A, FIG. 8A schematically illustrates an embodiment in which the transmission position of a burst is displaced less than the length of the burst.

FIGS. 7A–7C illustrate an alternative embodiment for displacement from a later to an earlier transmission position within a frame, i.e. an embodiment which is an alternative to the embodiment as described with reference to FIGS. 5A–5C. The denotations remain the same. As can be seen only a transitional burst $B_{TR}$ is sent during the transitional frame and from FIG. 7A it can be seen that a transitional burst is sent at the old position which is of a shorter duration so that the first burst $B_N$ in the subsequent frame can contain the ordinary number of bits. Of course a number of alternative embodiments are possible which still fall within the scope the present invention, e.g. the bursts sent within the transitional frame may comprise fewer bits than normally, what is essential is that the change is handled during a transitional frame are that no increased buffering means are required during the change.

Figure 8A:
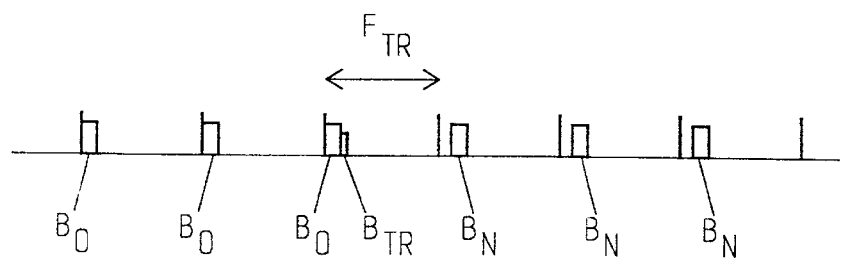
FIG. 8B is a graphical representation of the amount of data stored in buffering means of the terminal station when a displacement according to FIG. 8A is carried out.
FIG. 8C is a graphical representation of the amount of data stored in the buffering means of the central node when a displacement is carried out in agreement with FIG. 8A.
Figure 8B:
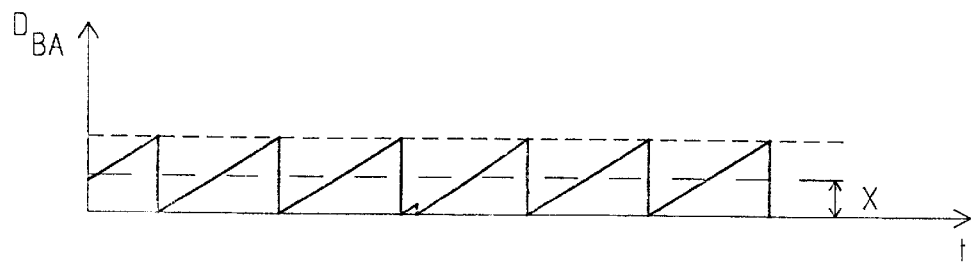
Figure 8C:
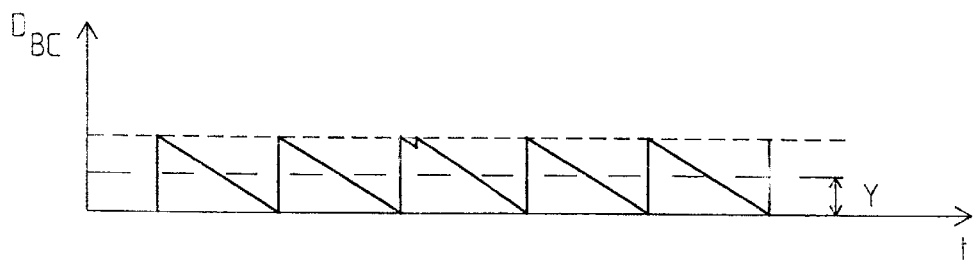

FIGS. 8A–8C illustrate an alternative embodiment relating to a displacement of the transmission position of a burst to a later position within the frame. In this case, however, the burst is only to be displaced to an extent which is smaller than that of the length of an ordinary burst $B_O$. In the embodiment illustrated in FIG. 8A the transitional burst constitutes an extension of an ordinary, i.e. the old, burst $B_O$, and it also contains the bits that have arrived to the terminal station during the sending of the ordinary burst $B_O$ during the transitional frame $F_{TR}$. FIGS. 8B and 8C in a similar manner illustrate the content in the buffering means of the terminal station and the central node respectively for the embodiment of FIG. 8A.

Figure 9A:
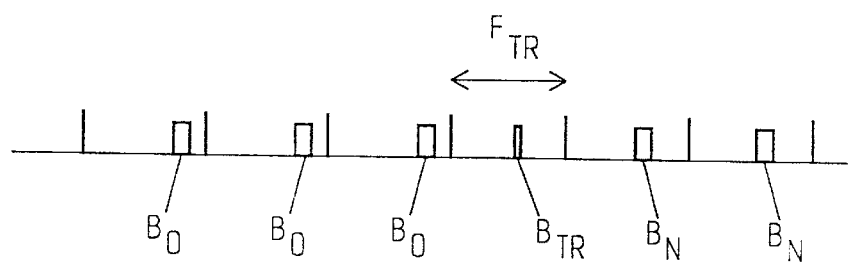
FIG. 9A shows an embodiment illustrating when the transmission position of a burst is displaced to an earlier position within the frame and the displacement is shorter than the length of a burst.
Figure 9B:
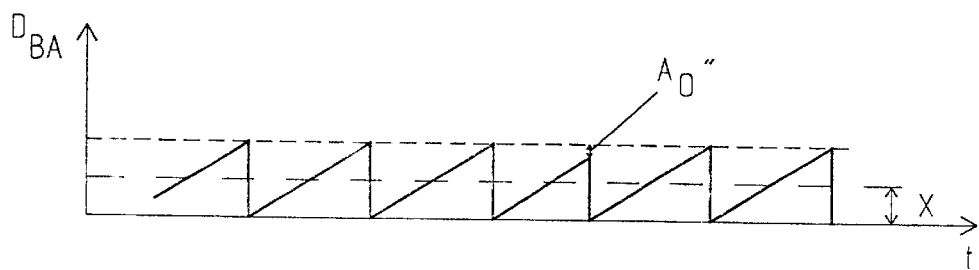
FIG. 9B is a graphical illustration similar to that of FIG. 8B but for the case as illustrated in FIG. 9A.
Figure 9C:
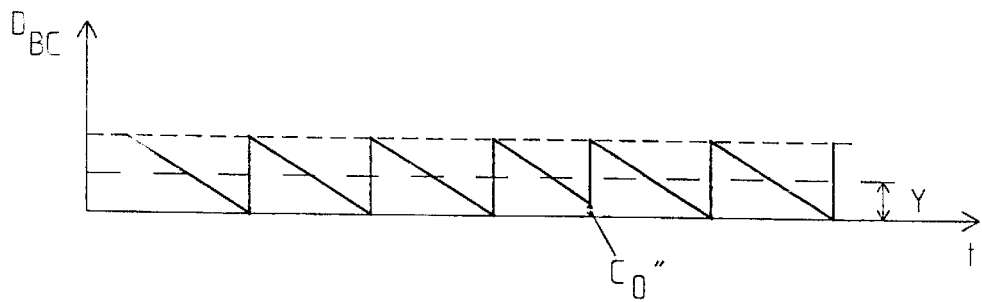
FIG. 9C is a graphical representation similar to that of FIG. 8C but for the embodiment as illustrated in FIG. 9A.

FIG. 9A shows an embodiment in which a burst is moved from a later frame position to an earlier frame position when the burst is moved to an extent that is smaller than the length of the old burst. In this case a transitional burst $B_{TR}$ is all what is sent during the transitional frame and it is sent at the new position. Since it is sent earlier, there will still be some unoccupied space in the buffering means of the terminal station indicated through $A_O''$ in FIG. 9B and in the corresponding manner the buffering means of the central node has only been emptied to a given extent and there will still be some remaining data contained in the buffering means, of the node, indicated through $C_O''$ in FIG. 9C.

Although the invention has been discussed in terms of the bursts from one and the same terminal having the same size (except for the transitional burst), the sizes of bursts from one and the same terminal station may also vary, but during the period of time that is contemplated, it is supposed that the size is substantially the same. However, the burst from different terminal stations are/can be different as discussed earlier.

The invention can be implemented in a number of different systems, particularly within microwave communication in point-to-multipoint systems but also in other point-to-multi-point systems. Furthermore it can be used for speech/data communication in transmission channels, in fibers, coaxial cables, copper cables etc.

What is claimed is:

1. A Time Division Multiple Access (TDMA) communication system comprising:
   one or more terminal stations each comprising buffering means and communicating with a respective user station, each terminal station transmitting information in bursts of varying lengths, said burst located within transmitted frames;
   a central node comprising node buffering means that receives the bursts from the one or more terminal stations using a first frequency and that transmits information to the one or more terminal stations using a second, different frequency; and
   scheduling means provided in the central node for controlling the transmission of the bursts from the one or more terminal stations, the scheduling means comprising:
      means for maintaining information about an actual transmission demand from each terminal station and about a connection or disconnection status of the one or more terminal stations, and
      control means for controlling the location of the bursts within each transmitted frame such that the node buffering means of the central node and the buffering means in the terminal stations do not exceed a buffer size required for steady state transmission so that the transmission delay in the system is minimized.

2. The system of claim 1, wherein the central node further comprises means for introducing a transitional frame during which a respective transmitting terminal station provides control information that includes information regarding displacing the location of bursts within subsequent transmission frames, wherein the scheduling means uses said control information to determine the amount and direction of the displacement of the burst location in the sub sequent transmission frames.

3. The system of claim 2, wherein the control information includes information regarding sending a burst from the respective terminal station in a later position within a frame in relation to the position at which th e burst from the corresponding terminal station was sent in a preceding frame(s).

4. The system of claim 2, wherein the control information includes information regarding sending a burst from the respective terminal station in an earlier position within a frame in relation to the position at which the burst from the corresponding terminal station was sent in a preceding frame(s).

5. The system of claim 2, wherein the means for maintaining information about actual transmission demands receives the control information.

6. The system of claim 2, wherein depending on the control information the scheduling means receives, the scheduling means decides which changes are to be undertaken and transmits scheduling information to the terminal stations to synchronize the terminal stations and the central node.

7. The system of claim 1, wherein the sizes of the terminal station buffering means and the node buffering means respectively are given by the frame length and the information transmission rate and are independent of the changes relating to burst position within a frame and burst length.

8. The system of claim 3, wherein during the transitional frame two bursts are sent at different positions of which one is a transitional burst.

9. The system of claim 8, wherein during the transitional frame a normal burst is sent at an earlier burst position and a transitional burst is sent at a new position, said transitional burst containing the data collected in the buffering means of the terminal station since sending a preceding burst.

10. The system of claim 8, wherein during the transitional frame a transitional burst is sent at an earlier old position and a burst is sent at a new position.

11. The system of claim 8, wherein the number of data bits in a transitional burst is a product of a rate at which information is received in the terminal station, a length of the frame, and a proportion of the length of the frame that the transmission position for the burst is to be displaced.

12. The system of claim 2, wherein in a subsequent frame following the transitional frame, a burst is sent in a new transmission position.

13. The system of claim 4, wherein during the transitional frame, only a transitional burst is sent that contains at least a part of data collected since sending a preceding burst in the preceding frame.

14. The system of claim 13, wherein during the transitional frame, a transitional burst is sent substantially at a new position assigned by the scheduling means, which contains data collected in the terminal station buffering means since the preceding transmission of a burst in the preceding frame.

15. The system of claim 13, wherein a transitional burst is sent during the transitional frame substantially at an old position that contains part of data collected in the terminal station buffering means.

16. The system of claim 14, wherein the transitional burst is smaller than a burst sent in an old position and ends at an end position at which a new burst of substantially the same size as a burst sent in the old position should have ended.

17. The system of claim 14, wherein the number of data bits in the transitional burst comprises a product of a data rate at which data is received in the terminal, a length of the frame, and a proportion of the frame length that the burst is to be displaced.

18. The system of claim 13, wherein if a burst is to be displaced less than a length of an old burst, the length of the old burst is extended so as to contain the bits received during the sending of said old burst.

19. The system of claim 14, wherein a burst smaller than an old burst is sent out during the transitional frame.

20. A method of communicating information on a transmission channel divided into frames, using TDMA, the information communicated from one or more terminal stations to a central node that continuously delivers information to a transmission network, wherein the terminal stations send information in bursts at given positions within the frames, the method comprising the steps of:
   collecting information in the central node about transmission demands of the terminal stations and about a connection and disconnection of terminal stations;
   determining in the node, using said information, whether the transmission position within transmission frames of bursts received from a terminal station needs to be displaced to an earlier or to a later position within the transmission frames to meet the transmission demands and to optimize the usage of the transmission channel's capacity;
   providing the terminal station with information about a new transmission position based on the determination in the node;
   introducing a transitional frame during which a change in transmission position occurs that includes sending a transitional burst without requiring enhanced buffering capacity neither in the node, nor in the terminal station; and sending in a subsequent frame at least a burst at the new position within the frame.

21. The method of claim 20, wherein the determining step further comprises the step of calculating the size of the transitional burst from a terminal station using information about the length and direction of displacement.

22. The method of claim 21, wherein the transmission position of a burst within a frame is changed to a later position and two bursts are sent during the transitional frame, one at an old position and one at the new position, one of the bursts being a transitional burst of a shorter duration.

23. The method of claim 22, wherein the sending step comprises:

sending a first burst at the old position;

collecting received information bits in buffering means in the terminal station; and sending a transitional burst at the new position comprising the information bits collected in the buffering means of the terminal station since the sending of a preceding burst from the same terminal station within the transitional frame.

24. The method of claim 22, wherein the sending step comprises:

sending a transitional burst at the old position within the frame, which burst comprises part of the information bits collected in buffering means in the terminal station; and sending an additional burst at the new position within the transitional frame containing the information bits collected in the terminal station buffering means.

25. The method of claim 22, wherein the sending step comprises changing the transmission position of the burst from a terminal station to an earlier position within the frames and sending a transitional burst in the transitional frame only.

26. The method of claim 25, wherein the sending step further comprises sending a transitional burst at the new position, which burst ends at the end position of the new position.

27. The method of claim 25, wherein the sending step further comprises sending a transitional burst at the old position within the frame, which burst comprises only part of the information collected in the terminal buffering means since the preceding transmission of a burst from the same terminal station in the preceding frame.

28. A method of rearranging the transmission positions for bursts of information sent from a number of terminal stations in a point-to-multipoint system using TDMA depending on the transmission demand of the terminal stations, the method comprising the steps of:

collecting information in a central node, said information regarding the transmission demands of the terminal stations;

establishing, with the use of said information, whether a burst of a particular station needs to be sent at an earlier or later position within a frame; and introducing a transitional frame during which information is sent in at least a transitional burst and in that in a subsequent frame the terminal station sends a burst at the new position without requiring any additional buffering capacity neither in the terminal station nor in the central node for performing the change of transmission position.

29. The method of claim 28, wherein the introducing step further comprises changing the transmission position from an earlier to a later position within a frame by sending one burst at the old position and sending another burst at the new position within the transitional frame.

30. The method of claim 28, wherein the introducing step further comprises changing the transmission position for a burst from a later position to an earlier position within a frame by sending only a transitional burst during the transitional frame.

31. Use of the system according to claim 1 for speech and/or data communication in transmission channels.

* * * * *